United States Patent [19]
Mortis et al.

[11] Patent Number: 5,832,509
[45] Date of Patent: Nov. 3, 1998

[54] APPARATUS AND METHOD FOR ADJUSTING DATA SIZES IN DATABASE OPERATIONS

[75] Inventors: George Mortis, Rochester Hills; William Cicala, Dearborn Heights, both of Mich.

[73] Assignee: Chrysler Corporation, Auburn Hills, Mich.

[21] Appl. No.: 767,885

[22] Filed: Dec. 17, 1996

[51] Int. Cl.$^6$ .................................................. G06F 17/30
[52] U.S. Cl. .................................... 707/200; 395/800.11
[58] Field of Search ............................... 707/1, 100, 200, 707/5, 10, 104, 206; 395/200.33, 200.57, 800.11, 674, 730; 364/146, 188, 189, 240, 164; 705/10

[56] References Cited

U.S. PATENT DOCUMENTS

| | | | |
|---|---|---|---|
| 5,159,546 | 10/1992 | Inoue et al. ............................... | 364/146 |
| 5,278,751 | 1/1994 | Adiano et al. ............................. | 705/10 |
| 5,329,619 | 7/1994 | Page et al. ........................... | 395/200.33 |
| 5,659,781 | 8/1997 | Larson ................................. | 395/800.11 |
| 5,724,600 | 3/1998 | Ogi .......................................... | 395/674 |

*Primary Examiner*—Thomas G. Black
*Assistant Examiner*—Ruay Lian Ho
*Attorney, Agent, or Firm*—Roland A. Fuller, III

[57] ABSTRACT

An apparatus for adjusting the size of data as it is exchanged between a computer program and a database in situations when the computer program and the database use different formats for the data which is to be exchanged. A datum transfer direction determinator determines whether the datum which has the incompatible data format is being transferred to the database or to the computer program. The determinator examines the database operation issued from the computer program to determine whether the computer program is to receive the datum as in the case of a retrieve database operation or the database is to receive the data as in the case of an insert database operation. Based upon the datum direction and a predetermined adjustment value, a data size adjuster then adjusts the size of the data to be compatible with the data size used by the intended recipient of the data.

36 Claims, 6 Drawing Sheets

APPARATUS AND METHOD FOR ADJUSTING DATA SIZES IN DATABASE OPERATIONS

BACKGROUND OF THE INVENTION

1. Technical Field

This invention generally relates to computer databases and more particularly to adjusting data sizes when performing data operations upon computer databases.

2. Discussion

Inevitably, computer programs and databases require updating. The updating typically includes increasing or decreasing data sizes of the data within the computer programs and the databases. For example, a piece of data which holds part number data may have to be increased from eight positions (e.g., part number =12345678) to ten positions (e.g., part number =1234567890) in order to hold a larger number of part numbers which a company may have in its inventory.

Correspondingly, it may be desirable to decrease the size of a piece of data upon a determination that the piece of data did not originally require such a large data size. For example, a piece of data which holds user notes regarding sales transactions may have its original estimation of its data size too large; and now based upon usage statistics, the data size does not require such a large data size but a significantly smaller one.

For a relatively small set of computer programs and databases, the amount of resources required to implement a change in data size at the same time could practically be implemented without a significant amount of "down time" of the system. The data sizes need to be changed at approximately the same time since differing data sizes between a computer program and databases would result in unsuccessful data exchanges between them since computer programs and databases require data format compatibility in order to exchange data.

For a rather large set of computer programs and databases, the amount of "down time" to change data sizes would have a deleterious effect upon the performance of the overall company. For example, an automotive company uses computer programs and databases to communicate sales, inventory, and engineering data to a large number of dealer, retail, engineering, accounting, and manufacturing personnel. These entities would not be able to access the data needed by them to perform their daily duties if a large "down time" of the company's computer database system were to occur.

The year "2000 problem" is an example of where inappropriate data sizes can cause errors for software systems. This problem entails a large number of date data variables being used within computer programs and databases that were sized to only represent years before 2000. Modifications to these date data variables to accommodate the years after 1999 necessitate changes in a large number of computer programs and databases. The changes will invariably cause a large amount of down time for large computer database systems.

SUMMARY OF THE INVENTION

The present invention allows computer program conversion and adjustment of any field to be independent of the physical database conversion. This approach facilitates the conversion of large number of computer programs that access many databases that contain field(s) that need to be expanded. Also, the approach minimizes the number of program compiles, by keeping the databases in their current structure until all the computer programs have been converted to use the expanded field(s).

The present invention was successfully used by 620 computer programs at Chrysler. A total of 52 IMS databases were accessed by these computer programs, with several computer programs accessing the same database. Moreover, one computer program could access more than one database. The present invention alleviated the massive coordination and timing requirement of converting everything at the same time, especially when computer programs fell to different systems and partitions. The present invention saved Chrysler approximately 4 million dollars.

The present invention includes a datum transfer direction determinator coupled to the computer program for determining a datum transfer direction. The datum transfer direction indicates whether the datum is being transferred to the computer program from the data store or the datum is being transferred to the data store from the computer program. The determining of said datum transfer direction is based upon the datum transfer command, said datum transfer direction being determined after said computer program has issued said datum transfer command; and a data size adjuster coupled to said datum transfer direction determinator and to said computer program and to said data store for adjusting the size of said datum based upon the determined datum transfer direction and upon a predetermined data size adjustment value, said adjusting being performed after said datum transfer direction determinator has determined the datum transfer direction and before said datum transfer command has operated upon said data store, said adjusted size of said datum being equal to the first size or the second size depending upon the datum transfer direction.

BRIEF DESCRIPTION OF THE DRAWINGS

Additional advantages and features of the present invention will become apparent from the subsequent description and the appended claims, taken in conjunction with the accompanying drawings, in which:

DETAILED DESCRIPTION OF THE PREFERRED EMBODIMENT

In one embodiment, the present invention facilitates the conversion of computer programs which access the hierarchical database IMS DL/I database (an IBM product). Therein, the part number field of converted computer programs had a larger data size (i.e., ten positions for a part number datum) than what the IMS database had for its part number field (i.e., eight positions for a part number datum).

Figure 1:
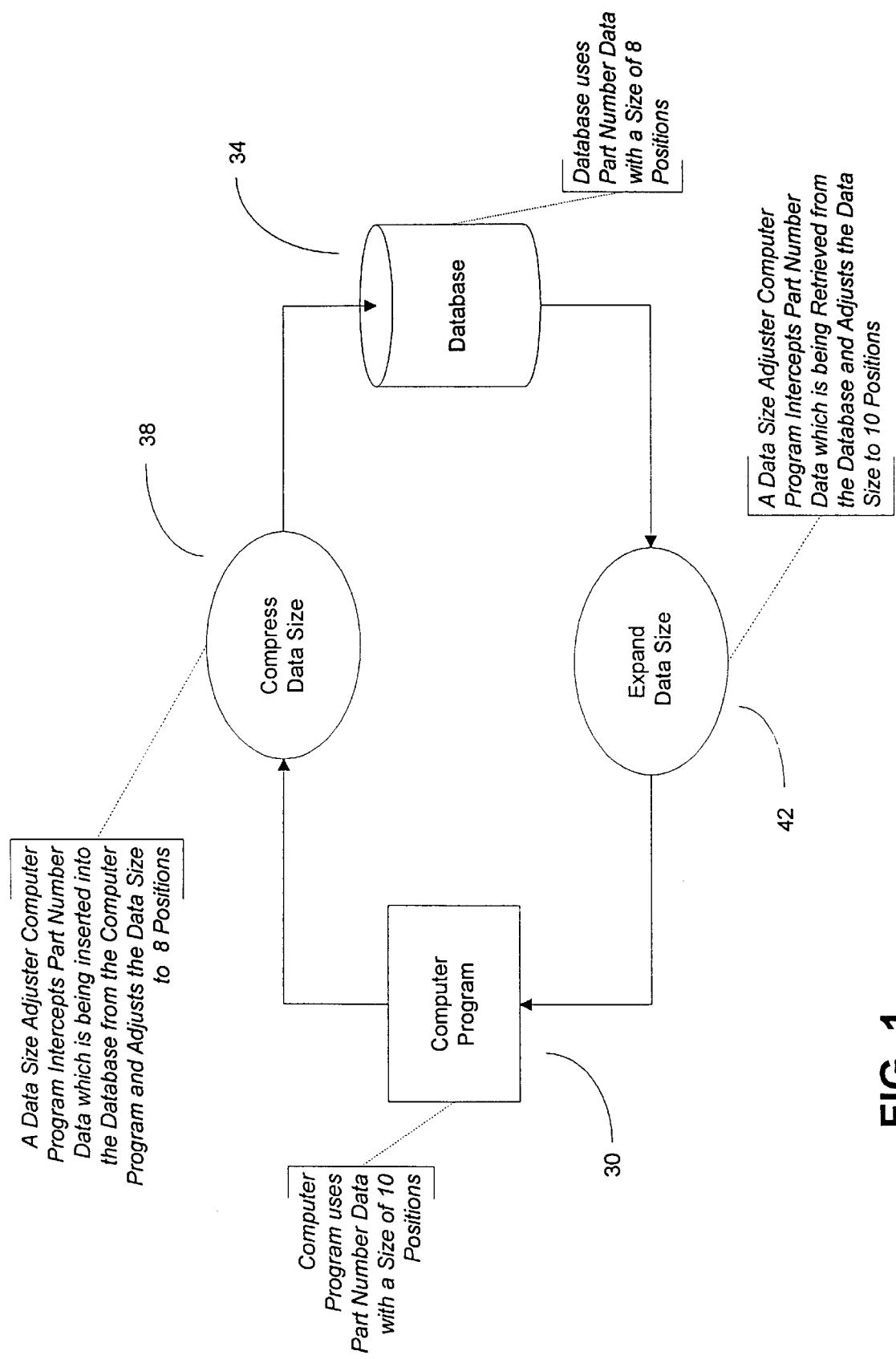
FIG. 1 is a system flow diagram depicting one mode of operation of adjusting sizes of data being exchanged between a computer program and a database.

FIG. 1 provides an example of one operational sequence of the present invention. The calls from a computer program 30 to an IMS database 34 are intercepted. The intercepting routine at function 38 compresses the Part Number field(s) to eight positions and passes to the IMS database 34 the current segment size on a Replace or Insert. The present invention expands at function 42 the Part Number field(s) and segment size, when the computer program 30 is accessing data from the IMS database 34.

Figure 2:
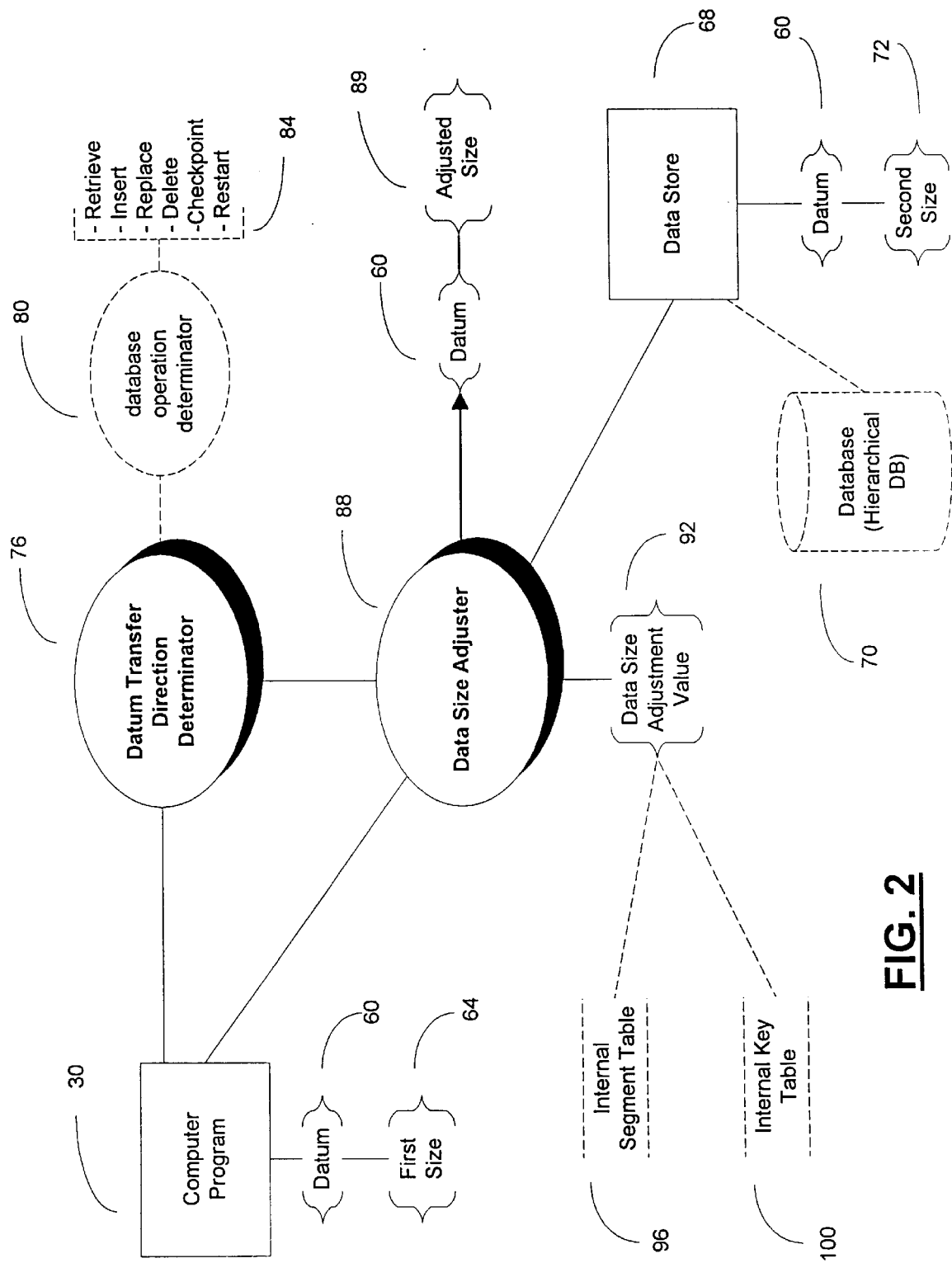
FIG. 2 is an entity relationship diagram depicting the interrelationships of the data size adjuster and the datum transfer direction determinator.

FIG. 2 depicts the interrelationship between the present invention and its environment. A computer program 30 uses a datum 60 (e.g., a part number field) with a first size 64, such as ten positions. A data store 68 (e.g., a hierarchical IMS database 70) uses the datum 60 but with a second size 72, such as eight positions.

A datum transfer direction determinator 76 determines the direction by which the data will be exchanged. The direction indicates whether a datum is being transferred to the computer program 30 or to the data store 68. The preferred embodiment uses a database operation determinator 80 to examine the database operation being used to effect the exchange of data between the computer program 30 and the data store 68. A list 84 provides an example of the type of database operation which the database operation determinator 80 can use to determine the direction of the exchange. For example a retrieval database operation indicates that the direction for the exchange of data is from the data store 68 to the computer program 30.

The data size adjuster 88 adjusts the size of the datum 60 which is being exchanged between the computer program 30 and the data store 68 so that a datum 60 with an adjusted size 89 is produced. The adjustment of the size of the datum is based upon the determined datum transfer direction and upon a predetermined data size adjustment value 92. The data size adjustment value 92 indicates how much the data size should be expanded or compressed. For example, the data size adjustment value 92 would be two if the computer program 30 has size of the datum at ten and the data store 68 has the size of the datum at eight.

For the preferred embodiment, a compression of a datum from ten places to eight places deletes the last two positions (i.e., ending positions) of the datum. For the preferred embodiment, an expansion of a datum from eight places to ten places involves "padding" the datum with two blank spaces (each of EBCDIC value of 40 decimal) at the end of the datum. However it is to be understood that the present invention is not limited to an expansion of a datum from eight places to ten since that expansion size serves only as an example. Correspondingly, the present invention is not limited to a contraction of a datum from ten to eight places since that contraction size serves only as an example.

The data size adjuster 88 is disposed between the computer program 30 and the data store 68 so that the datum is effectively intercepted before the datum has been received by the data store 68 or is effectively intercepted before the computer program 30 receives the requested datum depending upon the datum transfer direction.

For the preferred embodiment, an internal segment table 96 and an internal key table 100 store the data size adjustment value 92 for each particular datum type. The structure of the internal segment table 96 and the internal key table 100 is discussed in greater detail below.

Within the IMS environment, the preferred embodiment uses four called computer routines beginning with 'CBLT-CONV'. The 'CBLTCONV' routine replaces the 'CBLT-DLI' routine. The 'CBLTDLI' routine has the function of performing database operations against an IMS database from a COBOL or assembler program. The 'CBLTCONV' routine has the function of performing the same database operations as the CBLTDLI routine while expanding/compressing I/O areas and compressing SSAs when found in internal tables.

The present invention allows the computer program conversion and expansion of Part Number fields independent to the database conversion. Any IMS online or batch program that converts its I/O area to accept expanded Part Number field(s), has the normal call to IMS changed from 'CBLT-DLI' to 'CBLTCONV', whenever it is attempting to Get, Replace, Insert to, or Delete data from the 'converted' database. The I/O area refers to the segment(s) or records retrieved or to be inserted or updated from/to an IMS database. For the preferred embodiment, the parms passed to 'CBLTDLI' are the same parms currently passed to 'CBLT-DLI'. The term "parms" refers to any items following a call (i.e. database operation, db pcb, I/O area, and SSAs). The call to 'CBLTCONV' could be dynamic.

For the preferred embodiment, program 'CBLTCONV' is an assembler program that counts the number of parms passed from the computer program. It also calls a Cobol program 'CONVCBL' dynamically.

For the preferred embodiment, program 'CONVCBL' is a Cobol program that makes the call to IMS using 'CBLTDLI' before or after the I/O area and SSAs passed have been expanded or compressed. The term "SSA" refers to the keys or indexes passed to the IMS database to retrieve or update segment(s). Program 'CONVCBL' calls 'CONVSIZE'.

For the preferred embodiment, program 'CONVSIZE' is an assembler program that expands or compresses the I/O areas and SSAs passed to it.

For the preferred embodiment, the present invention consists of 4 called programs:

CBLTCONV (Assembler-called statically or dynamically)
CONVCBL (Cobol-called dynamically)
CBLTDLI (Standard IMS call, static)
CONVSIZE (Assembler-called dynamically)

Within the IMS environment, Cobol programs which access IMS databases use a "call" routine "CBLTDLI" supplied by IBM. This call routine requires information to be passed from the program to IMS to complete the desired database operation.

An example of a Call routine is as follows:

CALL 'CBLTDLI'

| | |
|---|---|
| using 'GU', | retrieval database operation |
| db-pcb, | database information |
| I/O area, | result of database retrieval (segment) |
| SSA | key or index used to retrieve data |

The above "call" is replaced with:

CALL 'CBLTCONV'

| | |
|---|---|
| using 'GU', | retrieval database operation |
| db-pcb, | database information |
| I/O area, | result of database retrieval |

The 'GU' term above refers to 'get unique', which indicates to the IMS to get a specific segment(s). The term 'db-pcb' above refers to the application view of the database structure.

Figure 3:
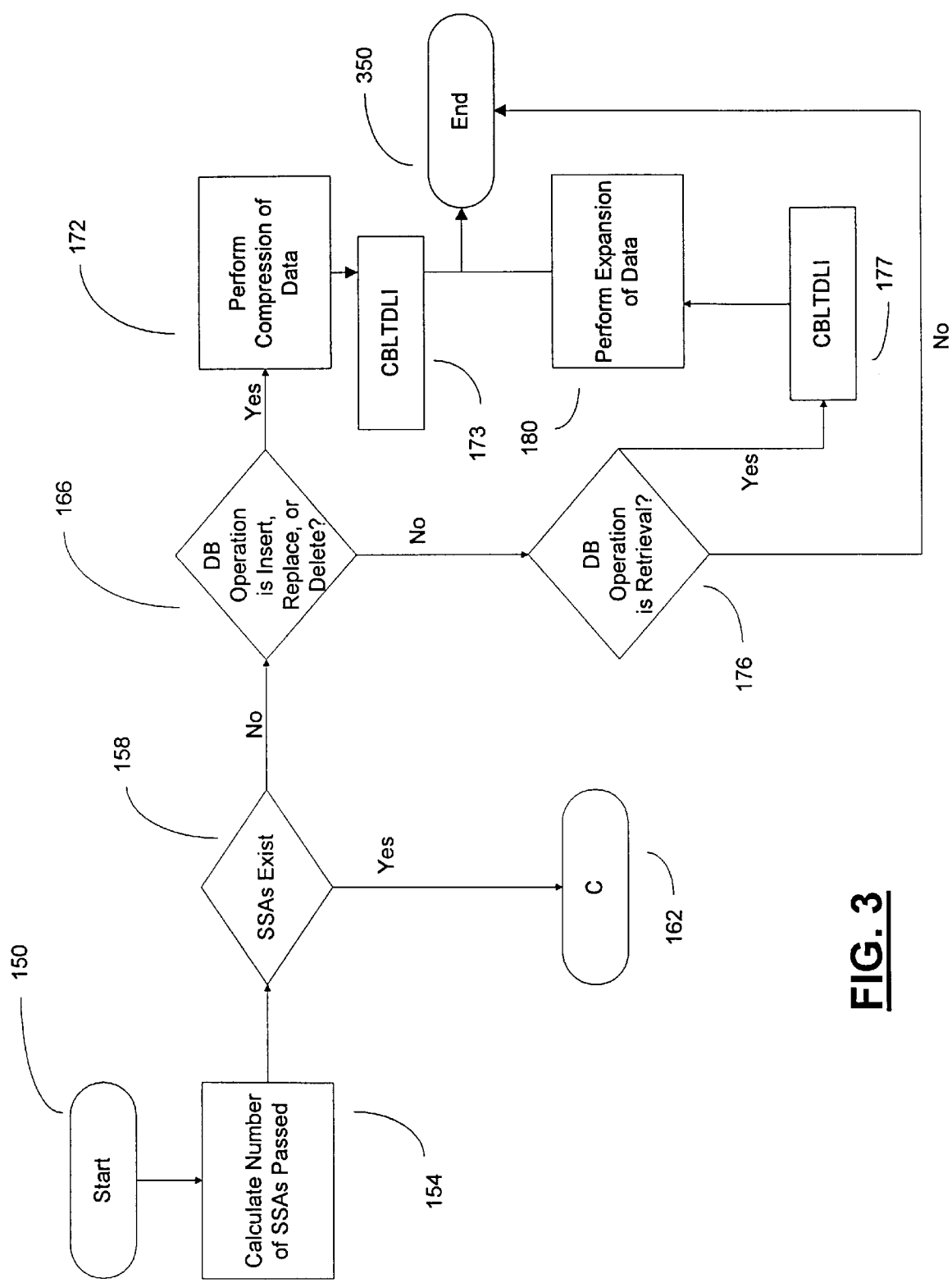
FIG. 3 is a flowchart depicting the functional flow for determining whether to compress or expand the size of data.

Referring to FIG. 3, the start block 150 indicates that the first block to be processed in the preferred embodiment is block 154. At block 154, the number of items being passed from the application program are calculated. In other words, a CBLTDLI call typically requires a minimum of three pieces of information (db operation, db-pcb, I/O area) and up to fifteen SSAs. Depending on the database operation and the number of SSAs passed, there may be more than one segment in the I/O area.

If Decision block 158 determines that SSAs exist, then processing continues at continuation block C 162. The existence of SSAs refers to the possibility that the key needs to be compressed. If Decision block 158 determines that SSAs do not exist, then processing continues at decision block 166.

If decision block 166 determines that the database operation is an insert, replace or delete operation, then block 172 is performed. Block 172 performs compression of the I/O area and then the CBLTDLI routine is called at block 173 before terminating at end block 350.

If decision block 166 determines that the database operation is not an insert, replace or delete operation, then decision block 176 is performed. If decision block 176 determines that the database operation is a retrieval, then the CBLTDLI routine is called at block 177 and the I/O area is expanded at block 180 before terminating at end block 350. If decision block 176 determines that the database operation is not a retrieval, then processing terminates at end block 350.

Figure 4:
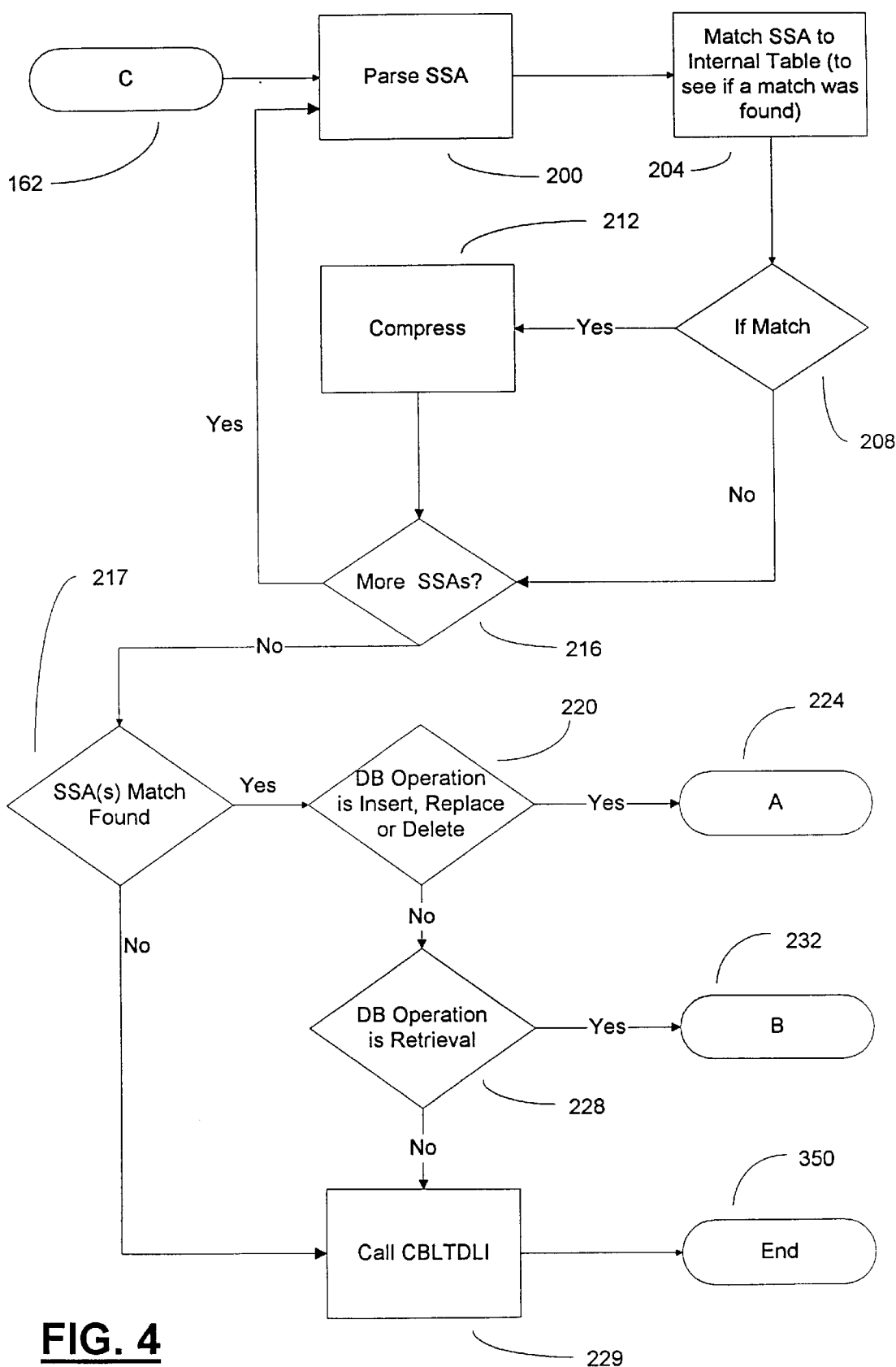
FIG. 4 is a flowchart depicting the functional flow for when segments exist.

Referring to FIG. 4, continuation block C 162 indicates that block 200 is to be processed wherein the SSAs are parsed. At block 204, the SSAs are matched to the internal table to see if a match was found in the table. If decision block 208 finds a match, then the I/O area is compressed at block 212, else decision block 216 is immediately processed.

If Decision block 216 determines that there are more SSAs, then processing continues at block 200. If Decision block 216 determines that there are no more SSAs, then processing continues at decision block 217. For each match found in the internal table as determined at decision block 217, processing continues at decision block 220; else processing continues at block 229 wherein the CBLTDLI routine is called before terminating at end block 350.

If decision block 220 determines that the database operation is an insert, replace or delete, then processing continues at continuation block A 224. If decision block 220 determines that the database operation is not an insert, replace or delete, then processing continues at decision block 228. If decision block 228 determines that the database operation is a retrieval, then processing continues at continuation block B 232. If decision block 228 determines that the database operation is not a retrieval, then processing continues at block 229.

Figure 5:
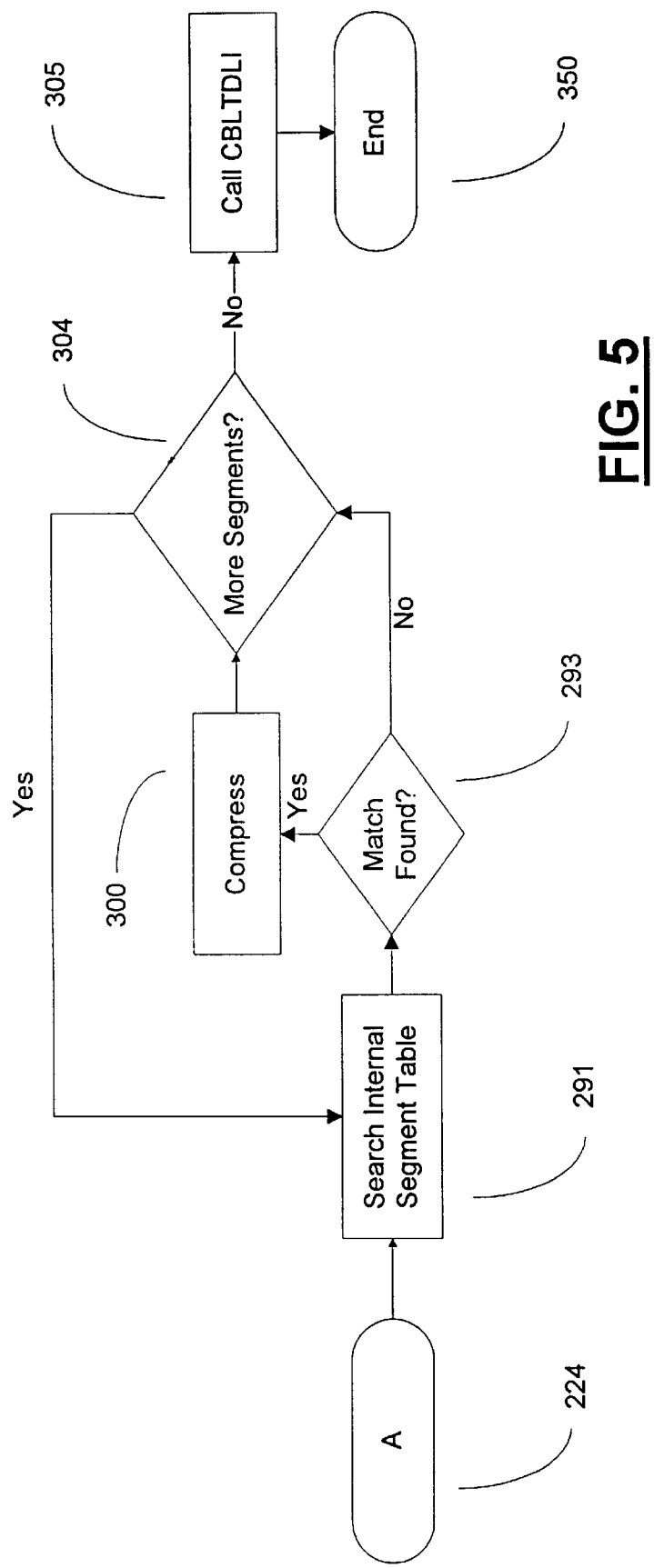
FIG. 5 is a flowchart depicting the functional flow for compressing data sizes.

Referring to FIG. 5, continuation block A 224 indicates that block 291 is to be processed wherein the internal segment table is searched. If a match is found at decision block 293, then the I/O area is compressed at block 300 and decision block 304 is processed next. If a match is not found at decision block 293, then decision block 304 is processed.

If decision block 304 determines that there are more segments, then processing continues at block 291, else processing continues at block 305. Block 305 calls the CBLTDLI routine and then processing is terminated at end block 350.

Figure 6:
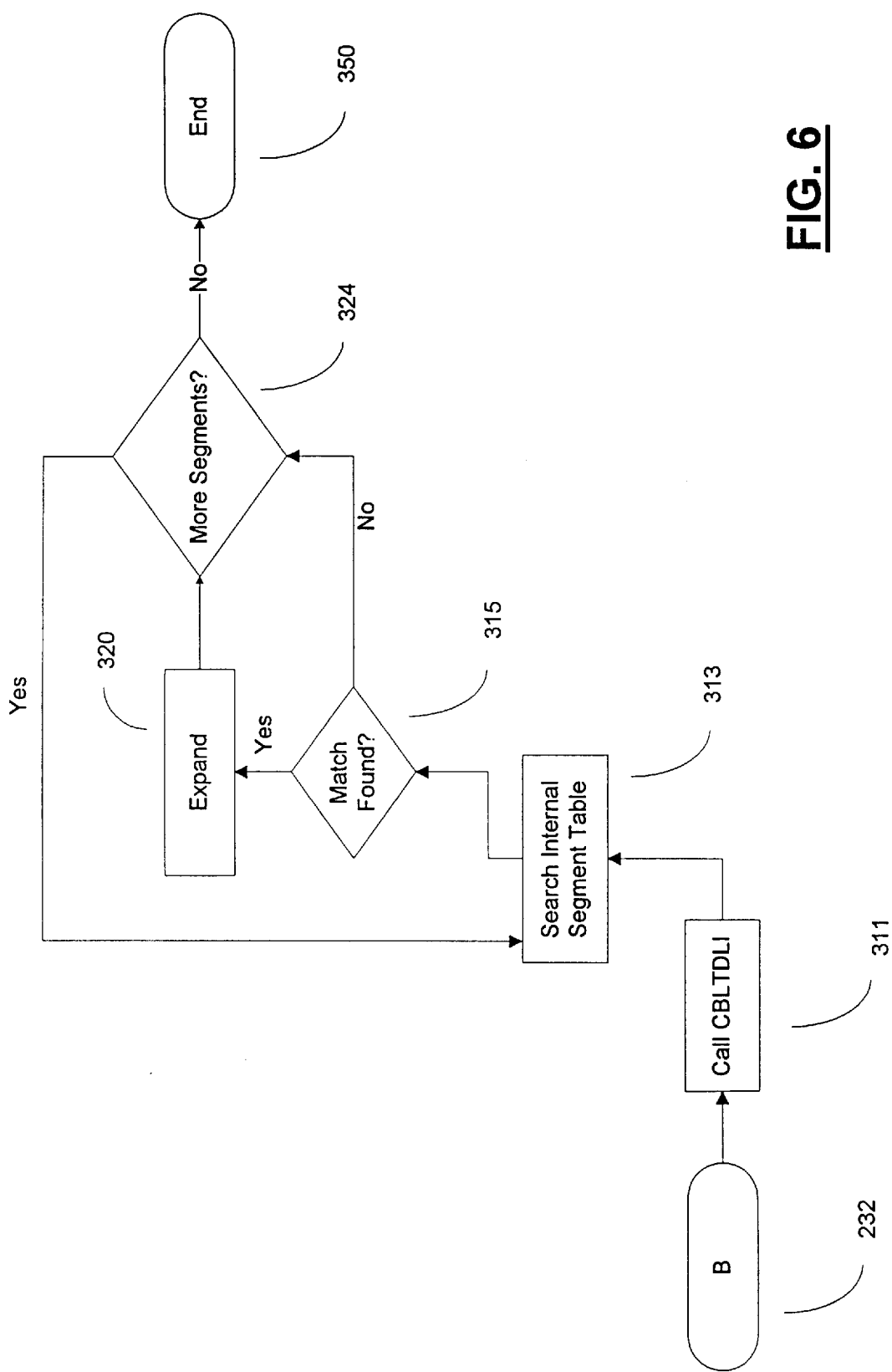
FIG. 6 is a flowchart depicting the functional flow for expanding data sizes.

Referring to FIG. 6, continuation block B 232 indicates that block 311 is to be processed wherein the CBLTDLI routine is called. Next, block 313 searches the internal segment table. If a match is found at decision block 315, then the I/O area is expanded at block 320 and decision block 324 is processed next. If a match is not found at decision block 315, then decision block 324 is processed. If decision block 324 determines that there are more segments, then processing continues at block 313, else processing terminates at end block 350.

The following processing is performed for compressing the I/O area from the computer program: using information from a prior retrieval operation, internal segment table and the SSAs passed, determine the size of the I/O area, the positions and lengths of the segment to be compressed; calls are then made to an assembler routine CONVSIZE to do the actual compression; a call is made for each segment in the I/O area. If the I/O area has more than one segment, the size of the I/O area as well as positions in the segment to be compressed are adjusted after each call to CONVSIZE.

After the SSA's and the I/O area are compressed, the normal CBLTDLI call is made. Control is returned to the application program (IMS returns a status).

The following processing is performed for expanding the I/O area from the computer: after SSAs are compressed, the normal CBLTDLI call is used to fill the I/O area; if the call was successful, the information from the internal segment table is used and the SSAs are passed, then the size of the I/O area is determined as well as the positions and lengths of the segments to be expanded.

Calls are then made to an assembler routine CONVSIZE to do the actual expansion. The number of calls depends on the number of segments returned from IMS. The expanded I/O area is passed to the application program. If the call was unsuccessful, return control to the application program, as well as IMS return status.

The following processing is performed to parse the SSAs as issued from the computer program: determine if the SSA has a valid, type, length or boolean operation present.

The following processing is performed for compressing the SSAs: Determine where in key, field is to be compressed; a call is made to assembler routine CONVSIZE to compress SSAs.

Internal Segment Table

The internal segment table is used to expand or compress the I/O area passed to program CONVCBL depending on the function call passed. It contains the data base name, segment name, segment size, the ending position of the part number and the size to expand or compress. Currently the table allows for 25 occurrences of part numbers per segment. Since some calls to IMS may include path calls it is necessary to enter all the segments within a database and their size though the segment may not contain a part number. The program allows for five rows for the same segments. In other words 5×5 or 25 occurrences. The table below reflects five rows allowing 25 positions for expansion or compression. An example of an internal segment table is as follows:

```
01 DBD-SEGMENT-TABLE.
05   DBD-SEG-TABLE.
     10    FILLER                      PIC X (45) VALUE
    'OCPTSDBDSFPARTRT02800008200882011620000000000'.
     12345678901234567890123456789012345678901 2345
          1         2         3         4
05   FILLER REDEFINES DBD-SEG-TABLE.
     10    DBD-SEG-TBL                 OCCURS 20 TIMES.
           INDEXED BY DBD-SEG-INDX.
        15   DST-DBD-SEG-NAME          PIC X(16).
        15   DST-SEG-SIZE              PIC 9(4).
```

-continued

```
15  DST-SEGMENT-PART              OCCURS 5 TIMES
        INDEXED BY DBD-SEG-PART-INDX.
        20  DST-PART-END-POS  PIC 9(4).
        20  DST-CHNG-LENGTH  PIC 9.
```

In the above example:

| | | |
|---|---|---|
| Positions 1 | 8: Database Name: | OCPTSDBD |
| Positions 9 | 16: Segment Name: | SFPARTRT |
| Positions 17 | 20: Segment Size: | 0280 |
| Positions 21 | 24: 1st PartNo ending position: | 0088 |
| Positions 25 | 25: 1st PartNo change length | 2 |
| Positions 26 | 29: 2nd PartNo ending position: | 0116 |
| Positions 30 | 30: 2nd PartNo change length | 2 |
| Positions 31 | 34: 3rd PartNo ending position: | 0000 |
| Positions 35 | 35: 3rd PartNo change length | 0 |
| Positions 36 | 39: 4th PartNo ending position: | 0000 |
| Positions 40 | 40: 4th PartNo change length | 0 |
| Positions 41 | 44: 5th PartNo ending position: | 0000 |
| Positions 45 | 45: 5th PartNo change length | 0 |

Since part number occurred twice on the segment (a maximum of 25 part number occurrences are allowed), the two ending positions of part number and their corresponding change length were entered. If part number did not occur in the segment, but the segment could be used in a path call enter the database name, segment name and the segment size. The remainder of the fields should be zeroes.

New entries to the table requires the occurs statement to be modified. Entries in the table do not have to be in any particular order. A find all on x(45) will determine how many occurrences this table should have. If an error is made the Cobol compiler will catch the error.

Internal Key Table

The internal key table contains the database name, segment name, the key name, the ending position of the part number and the size to compress. Only the keys that contain part number are entered into this table. An example of an internal key table is as follows:

```
01  DBD-SEGMENT-KEY-TABLE.
    05      DBD-SEG-KEY-TABLE.
            10 FILLER                      PIC X(49) VALUE
    'OCPTSDBDSFPARTRTFKPRTNBR00082000000000000000000000'.
    123456789012345678901234567890123456789012345678901234567890
             1         2         3         4
    05          FILLER REDEFINES DBD-SEG-KEY-TABLE.
        10  DBD-SEG-KEY-TBL                OCCURS 25
                                           TIMES
            INDEXED BY DBD-SEG-KEY-INDX.
            15  DSKT-DBD-SEG-KEY-NAME  PIC X(24).
            15  DSKT-KEY-PART              OCCURS 5 TIMES.
                20  DSKT-PART-END-POS  PIC 9(4).
```

In the above example:

| | | |
|---|---|---|
| Positions 1 | 8: Database Name: | OCPTSDBD |
| Positions 9 | 16: Segment Name: | SFPARTRT |
| Positions 17 | 24: Segment key Name: | FKPRTNBR |
| Positions 25 | 28: 1st PartNo ending position: | 0008 |
| Positions 29 | 29: 1st PartNo change length | 2 |
| Positions 30 | 33: 2nd PartNo ending position: | 0000 |
| Positions 34 | 34: 2nd PartNo change length | 0 |
| Positions 35 | 38: 3rd PartNo ending position: | 0000 |
| Positions 39 | 39: 3rd PartNo change length | 0 |
| Positions 40 | 43: 4th PartNo ending position: | 0000 |
| Positions 44 | 44: 4th PartNo change length | 0 |
| Positions 45 | 48: 5th PartNo ending position: | 0000 |
| Positions 49 | 49: Sth PartNo change length | 0 |

Entries need to be made to this table only if the key to the segment or the alternate key contain a part number. If a key is concatenated (with 2 or more part numbers or a part number and something else like a date), the position is entered where the part number(s) ends (a maximum of 25 part number occurrences are allowed). A find all on x(49) will determine how many occurrences this table should have. If an error is made the Cobol compiler detects the error.

The following is an example of an SSA:

```
01  SSA-QUAL-SFPARTRT-SEGMENT.
05  SSA-QUAL-SFPARTRT-SEG-NAME    PIC X(08) VALUE 'SFPARTRT'.
05  SSA-QUAL-SFPARTRT-QUAL        PIC X(01) VALUE '('.
05  SSA-QUAL-SFPARTRT-KEY-NAME    PIC X(08) VALUE 'FKPRTNBR'.
05  SSA-QUAL-SFPARTRT-OPER        PIC X(02) VALUE '='.
05  SSA-QUAL-SFPARTRT-KEY         PIC X(10) VALUE SPACES.
05  SSA-QUAL-SFPARTRT-END         PIC X(01) VALUE ')'.
```

In this example, FKPRTNMBR is the key to the SFPARTRT segment in the OCPTSDBD database. The length of the part number defined to IMS is 8 (application program will pass a 10 position part number) and the size is to be truncated 2 positions.

While it will be apparent that the preferred embodiment of the invention disclosed is well calculated to provide the advantages and features above stated, it will be appreciated that the invention is susceptible to modification, variation, and change without departing from the proper scope of fair meaning of the subjoined claims.

What is claimed is:

1. An apparatus for adjusting the size of a datum being transferred between a computer program and a data store, said datum being transferred based upon a datum transfer command issued from said computer program, said datum transfer command operating upon said data store, said computer program using said datum with a first size, said data store using said datum with a second size, said first size differing from said second size, comprising:

a datum transfer direction determinator coupled to said computer program for determining a datum transfer direction, said datum transfer direction indicating whether said datum is being transferred to said computer program from said data store or said datum is being transferred to said data store from said computer program, said determining of said datum transfer direction being based upon said datum transfer command, said datum transfer direction being determined after said computer program has issued said datum transfer command; and a data size adjuster coupled to said datum transfer direction determinator and to said computer program and to said data store for adjusting the size of said datum based upon the determined datum transfer direction and upon a predetermined data size adjustment value, said adjusting being performed after said datum transfer direction determinator has determined the datum transfer direction and before said datum transfer command has operated upon said data store, said adjusted size of said datum being equal to the first size or the second size depending upon the datum transfer direction.

2. The apparatus according to claim 1 wherein said datum transfer command is a database operation, said datum transfer direction determinator using a database operation determinator to determine the type of database operation to be performed upon said database by said computer program, said type of database operation being determined by analyzing said database operation after said computer program has sent said database operation and before said database has received said database operation, said data store being a database.

3. The apparatus according to claim 2 wherein said adjusted size of said datum is equal to the first size when said database operation is a retrieval database command, and wherein said adjusted size of said datum is equal to the second size when said database operation is an inserting or replacing database command.

4. The apparatus according to claim 2 further comprising an internal segment table and an internal key table, said internal segment table storing the name of said database, the name of said datum, and an adjustment size for said datum, said internal key table storing the name of said database, keys of said database, the name of said datum, and an adjustment size for said datum.

5. The apparatus according to claim 2 wherein said data size adjuster increases the size of said datum based upon said data size adjustment value, and wherein said data size adjuster decreases the size of said datum based upon said data size adjustment value, said data size adjustment value being indicative of the number of bytes to adjust the size of said datum.

6. The apparatus according to claim 2 wherein said data size adjuster adds a predetermined string to said datum when said data size adjuster is to increase the size of said datum, wherein the size of said predetermined string is based upon said data size adjustment value.

7. The apparatus according to claim 2 wherein said data size adjuster deletes a predetermined number of ending positions of said datum when said data size adjuster is to decrease the size of said datum, said predetermined amount being based upon said data size adjustment value.

8. The apparatus according to claim 2 wherein said data size adjuster adjusts the size of said datum within a predetermined input/output area.

9. A method for adjusting the size of a datum being transferred between a computer program and a data store, said datum being transferred based upon a datum transfer command issued from said computer program, said datum transfer command operating upon said data store, said computer program using said datum with a first size, said data store using said datum with a second size, said first size differing from said second size, comprising the steps of:

receiving the datum transfer command from said computer program;

determining a data transfer direction, said datum transfer direction indicating whether said datum is being transferred to said computer program from said data store or said datum is being transferred to said data store from said computer program, said determining of said datum transfer direction being based upon said datum transfer command;

adjusting the size of said datum based upon the determined datum transfer direction and upon a predetermined data size adjustment value, said adjusted size of said datum being equal to the first size or the second size depending upon the datum transfer direction; and sending the datum in its adjusted data size to an intended recipient, said intended recipient being based upon said determined datum transfer direction.

10. The method according to claim 9 wherein said datum transfer command is a database operation, said method comprising the further step of determining the type of database operation to be performed upon said database by said computer program, said type of database operation being determined by analyzing said database operation after said computer program has sent said database operation and before said database has received said database operation, said data store being a database.

11. The method according to claim 10 wherein said adjusted size of said datum is equal to the first size when said database operation is a retrieval database command.

12. The method according to claim 10 wherein said adjusted size of said datum is equal to the second size when said database operation is an inserting or replacing database operation command.

13. The method according to claim 10 wherein an internal segment table stores the name of said database, the name of said datum, and an adjustment size for said datum, and wherein an internal key table stores the name of said database, keys of said database, the name of said datum, and an adjustment size for said datum.

14. The method according to claim 10 further comprising the steps of:

increasing the size of said datum based upon said data size adjustment value; and decreasing the size of said datum based upon said data size adjustment value, said data size adjustment value being indicative of the number of bytes to adjust the size of said datum.

15. The method according to claim 10 further comprising the step of:

adding a predetermined string to said datum when the size of said datum is to be increased, wherein the size of said predetermined string is based upon said data size adjustment value.

16. The method according to claim 10 further comprising the step of:

deleting a predetermined number of ending positions of said datum by a predetermined amount when the size of said datum is to be decreased, said predetermined amount being based upon said data size adjustment value.

17. The method according to claim 10 further comprising the step of:

adjusting the size of said datum within a predetermined input/output area.

18. An apparatus for adjusting the size of a datum being transferred between a computer program and a data store, said datum being transferred based upon a datum transfer command issued from said computer program, said datum transfer command operating upon said data store wherein said datum transfer command is a database operation, said computer program using said datum with a first size, said data store using said datum with a second size, said first size differing from said second size, comprising:

a datum transfer direction determinator coupled to said computer program for determining a datum transfer direction, said datum transfer direction indicating whether said datum is being transferred to said computer program from said data store or said datum is being transferred to said data store from said computer program, said determining of said datum transfer direction being based upon said datum transfer command, said datum transfer direction being determined after said computer program has issued said datum transfer command, said datum transfer direction determinator using a database operation determinator to determine the type of database operation to be performed upon said database by said computer program, said type of database operation being determined by analyzing said database operation after said computer program has sent said database operation and before said database has received said database operation, said data store being a database; and a data size adjuster coupled to said datum transfer direction determinator and to said computer program and to said data store for adjusting the size of said datum based upon the determined datum transfer direction and upon a predetermined data size adjustment value, said adjusting being performed after said datum transfer direction determinator has determined the datum transfer direction and before said datum transfer command has operated upon said data store, said adjusted size of said datum being equal to the first size or the second size depending upon the datum transfer direction, wherein said adjusted size of said datum is equal to the first size when said database operation is a retrieval database command.

19. The apparatus according to claim 18 further comprising:

an internal segment table, said internal segment table storing the name of said database, the name of said datum, and said adjustment size for said datum; and an internal key table, said internal key table storing the name of said data base, keys of said database, the name of said datum, and said adjustment size for said datum.

20. The apparatus according to claim 18 wherein said data size adjuster increases the size of said datum based upon said data size adjustment value, and wherein said data size adjuster decreases the size of said datum based upon said data size adjustment value, said data size adjustment value being indicative of the number of bytes to adjust the size of said datum.

21. The apparatus according to claim 18 wherein said data size adjuster adds a predetermined string to said datum when said data size adjuster is to increase the size of said datum, wherein the size of said predetermined string is based upon said data size adjustment value.

22. The apparatus according to claim 18 wherein said data size adjuster deletes a predetermined number of ending positions of said datum when said data size adjuster is to decrease the size of said datum, said predetermined amount being based upon said data size adjustment value.

23. The apparatus according to claim 18 wherein said data size adjuster adjusts the size of said datum within a predetermined input/output area.

24. An apparatus for adjusting the size of a datum being transferred between a computer program and a data store, said datum being transferred based upon a datum transfer command issued from said computer program, said datum transfer command operating upon said data store wherein said datum transfer command is a database operation, said computer program using said datum with a first size, said data store using said datum with a second size, said first size differing from said second size, comprising:

a datum transfer direction determinator coupled to said computer program for determining a datum transfer direction, said datum transfer direction indicating whether said datum is being transferred to said computer program from said data store or said datum is being transferred to said data store from said computer program, said determining of said datum transfer direction being based upon said datum transfer command, said datum transfer direction being determined after said computer program has issued said datum transfer command, said datum transfer direction determinator using a database operation determinator to determine the type of database operation to be performed upon said database by said computer program, said type of database operation being determined by analyzing said database operation after said computer program has sent said database operation and before said database has received said database operation, said data store being a database; and a data size adjuster coupled to said datum transfer direction determinator and to said computer program and to said data store for adjusting the size of said datum based upon the determined datum transfer direction and upon a predetermined data size adjustment value, said adjusting being performed after said datum transfer direction determinator has determined the datum transfer direction and before said datum transfer command has operated upon said data store, said adjusted size of said datum being equal to the first size or the second size depending upon the datum transfer direction, wherein said adjusted size of said datum is equal to the second size when said database operation is an inserting or replacing database command.

25. The apparatus according to claim 24 further comprising:

an internal segment table, said internal segment table storing the name of said database, the name of said datum, and said adjustment size for said datum; and an internal key table, said internal key table storing the name of said database, keys of said database, the name of said datum, and said adjustment size for said datum.

26. The apparatus according to claim 24 wherein said data size adjuster increases the size of said datum based upon said data size adjustment value, and wherein said data size adjuster decreases the size of said datum based upon said data size adjustment value, said data size adjustment value being indicative of the number of bytes to adjust the size of said datum.

27. The apparatus according to claim 24 wherein said data size adjuster adds a predetermined string to said datum when said data size adjuster is to increase the size of said datum, wherein the size of said predetermined string is based upon said data size adjustment value.

28. The apparatus according to claim 24 wherein said data size adjuster deletes a predetermined number of ending positions of said datum when said data size adjuster is to decrease the size of said datum, said predetermined amount being based upon said data size adjustment value.

29. The apparatus according to claim 24 wherein said data size adjuster adjusts the size of said datum within a predetermined input/output area.

30. A method for adjusting the size of a datum being transferred between a computer program and a data store, said datum being transferred based upon a datum transfer command issued from said computer program, said datum transfer command operating upon said data store, wherein said datum transfer command is a database operation, said computer program using said datum with a first size, said data store using said datum with a second size, said first size differing from said second size, comprising the steps of:

receiving the datum transfer command from said computer program;

determining a data transfer direction, said datum transfer direction indicating whether said datum is being transferred to said computer program from said data store or said datum is being transferred to said data store from said computer program, said determining of said datum transfer direction being based upon said datum transfer command;

adjusting the size of said datum based upon the determined datum transfer direction and upon a predetermined data size adjustment value, said adjusted size of said datum being equal to the first size or the second size depending upon the datum transfer direction, wherein said adjusted size of said datum is equal to the first size when said database operation is a retrieval database command;

sending the datum in its adjusted data size to an intended recipient, said intended recipient being based upon said determined datum transfer direction; and determining the type of database operation to be performed upon said database by said computer program, said type of database operation being determined by analyzing said database operation after said computer program has sent said database operation and before said database has received said database operation, said data store being a database.

31. The method according to claim 30 wherein said adjusted size of said datum is equal to the second size when said database operation is an inserting or replacing database operation command.

32. The method according to claim 30 wherein an internal segment table stores the name of said database, the name of said datum, and an adjustment size for said datum, and wherein an internal key table stores the name of said database, keys of said database, the name of said datum, and an adjustment size for said datum.

33. The method according to claim 30 further comprising the steps of:

increasing the size of said datum based upon said data size adjustment value; and decreasing the size of said datum based upon said data size adjustment value, said data size adjustment value being indicative of the number of bytes to adjust the size of said datum.

34. The method according to claim 30 further comprising the step of:

adding a predetermined string to said datum when the size of said datum is to be increased, wherein the size of said predetermined string is based upon said data size adjustment value.

35. The method according to claim 30 further comprising the step of:

deleting a predetermined number of ending positions of said datum by a predetermined amount when the size of said datum is to be decreased, said predetermined amount being based upon said data size adjustment value.

36. The method according to claim 30 further comprising the step of:

adjusting the size of said datum within a predetermined input/output area.

* * * * *